United States Patent
Mokashi et al.

(10) Patent No.: US 12,499,404 B2
(45) Date of Patent: Dec. 16, 2025

(54) SYSTEM AND METHOD FOR QUALITY PLANNING DATA EVALUATION USING TARGET KPIs

(71) Applicant: Nice Ltd., Ra'anana (IL)

(72) Inventors: Abhijit Mokashi, Pune (IN); Onkar Hingne, Pune (IN)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 17/874,976

(22) Filed: Jul. 27, 2022

(65) Prior Publication Data

US 2024/0046191 A1 Feb. 8, 2024

(51) Int. Cl.
*G06Q 10/0639* (2023.01)

(52) U.S. Cl.
CPC . *G06Q 10/06395* (2013.01); *G06Q 10/06393* (2013.01)

(58) Field of Classification Search
None
See application file for complete search history.

(56) References Cited

U.S. PATENT DOCUMENTS

| | | | | |
|---|---|---|---|---|
| 4,783,796 A | * | 11/1988 | Ladd | H04M 3/38 379/212.01 |
| 7,376,129 B2 | * | 5/2008 | Acharya | H04L 65/1096 370/352 |
| 7,809,127 B2 | * | 10/2010 | Hackbarth, Jr. | G06Q 10/06398 379/265.06 |
| 8,078,486 B1 | * | 12/2011 | McLean | G06Q 10/063114 705/7.14 |
| 8,126,133 B1 | * | 2/2012 | Everingham | G06Q 10/063112 379/265.06 |
| 8,553,872 B2 | | 10/2013 | Geffen et al. | |
| 8,600,034 B2 | * | 12/2013 | Teitelman | H04M 3/5175 379/265.06 |

(Continued)

FOREIGN PATENT DOCUMENTS

| WO | WO-2008075329 A2 | * | 6/2008 | | H04M 3/5175 |
| WO | WO-2016196234 A1 | * | 12/2016 | | G06Q 10/063118 |
| WO | WO-2018064199 A2 | * | 4/2018 | | G06Q 30/015 |

OTHER PUBLICATIONS

Park, Youngja, and Stephen C. Gates. "Towards real-time measurement of customer satisfaction using automatically generated call transcripts." Proceedings of the 18th ACM conference on Information and knowledge management. 2009. (Year: 2009).*

(Continued)

*Primary Examiner* — Timothy Padot
*Assistant Examiner* — Derick J Holzmacher
(74) *Attorney, Agent, or Firm* — PEARL COHEN ZEDEK LATZER BARATZ LLP

(57) ABSTRACT

Systems and methods for monitoring a quality of interactions include: receiving one or more quality metrics relating to one or more quality targets; determining, on a periodic basis, a current quality value for each of the one or more quality targets; calculating a deviation of the current quality value from a desired value of the quality target; weighting the one or more quality targets according to the calculated deviation; and determining a set of one or more interactions for review based on one or more quality metric deviations and the weighted quality targets.

10 Claims, 6 Drawing Sheets

(56) References Cited

U.S. PATENT DOCUMENTS

| | | | | |
|---|---|---|---|---|
| 9,178,998 | B2* | 11/2015 | O'Connor | H04M 3/5191 |
| 9,614,890 | B2* | 4/2017 | Waxman | H04L 65/65 |
| 9,787,838 | B1* | 10/2017 | Lembersky | H04M 3/5191 |
| 10,152,717 | B1* | 12/2018 | Aldrich | G06Q 30/016 |
| 10,616,413 | B1* | 4/2020 | Vyas | H04M 3/5175 |
| 11,076,047 | B1* | 7/2021 | Clodore | G06Q 30/016 |
| 11,295,315 | B2* | 4/2022 | Veggalam | H04M 3/5191 |
| 11,425,250 | B1* | 8/2022 | Cessna | H04M 3/5232 |
| 2006/0047566 | A1* | 3/2006 | Fleming | G06Q 10/10 705/7.41 |
| 2006/0271418 | A1* | 11/2006 | Hackbarth, Jr. | G06Q 10/06398 379/265.01 |
| 2007/0195944 | A1* | 8/2007 | Korenblit | G06Q 50/20 379/265.06 |
| 2007/0198323 | A1* | 8/2007 | Bourne | G06Q 10/0639 705/7.41 |
| 2007/0198325 | A1* | 8/2007 | Lyerly | G06Q 10/06 705/7.41 |
| 2007/0198329 | A1* | 8/2007 | Lyerly | G06Q 10/0639 705/7.42 |
| 2007/0198330 | A1* | 8/2007 | Korenblit | G06Q 10/06398 705/7.42 |
| 2007/0206768 | A1* | 9/2007 | Bourne | G06Q 10/063112 379/265.01 |
| 2008/0177615 | A1* | 7/2008 | Chen-Ritzo | G06Q 10/0635 705/7.28 |
| 2008/0219243 | A1* | 9/2008 | Silverman | H04M 3/5175 370/352 |
| 2010/0020943 | A1* | 1/2010 | Hasegawa | H04M 3/42221 379/69 |
| 2010/0217591 | A1* | 8/2010 | Shpigel | G10L 15/32 704/235 |
| 2010/0246799 | A1* | 9/2010 | Lubowich | H04M 3/5175 379/265.09 |
| 2011/0289220 | A1* | 11/2011 | Henson | H04M 3/5116 709/227 |
| 2012/0066016 | A1* | 3/2012 | Minert | G06Q 10/06312 705/7.13 |
| 2012/0088475 | A1* | 4/2012 | Portman | H04L 12/1831 455/412.1 |
| 2013/0142322 | A1* | 6/2013 | Grasso | G06Q 10/06398 379/265.06 |
| 2014/0185790 | A1* | 7/2014 | Leta | G06Q 10/06398 379/265.08 |
| 2015/0092936 | A1* | 4/2015 | Riefel | H04M 3/523 379/265.03 |
| 2016/0086125 | A1* | 3/2016 | Hanrahan | G06Q 10/06398 705/7.42 |
| 2016/0219143 | A1* | 7/2016 | Zilles | H04M 3/242 |
| 2016/0239780 | A1* | 8/2016 | Liljenquist | G06Q 10/06393 |
| 2016/0350699 | A1* | 12/2016 | Vymenets | G06Q 10/063118 |
| 2016/0360466 | A1* | 12/2016 | Barak | G06Q 30/02 |
| 2018/0054518 | A1* | 2/2018 | Kolodizner | H04M 3/5183 |
| 2018/0060830 | A1* | 3/2018 | Abramovici | G06Q 10/1097 |
| 2018/0096278 | A1* | 4/2018 | Lev-Tov | G10L 15/22 |
| 2018/0096617 | A1* | 4/2018 | Tapuhi | G06Q 10/0639 |
| 2018/0096687 | A1* | 4/2018 | Cook | G10L 15/01 |
| 2018/0262618 | A1* | 9/2018 | Stern | H04M 3/5175 |
| 2020/0065831 | A1* | 2/2020 | Shachaf | G06Q 30/0201 |
| 2020/0236719 | A1* | 7/2020 | Kim | H04W 74/0833 |
| 2021/0157834 | A1* | 5/2021 | Sivasubramanian | G06F 16/686 |
| 2021/0203784 | A1* | 7/2021 | Konig | G06Q 30/01 |
| 2022/0092512 | A1* | 3/2022 | Dhawan | G06Q 10/06398 |
| 2022/0198364 | A1* | 6/2022 | Dhawan | H04M 3/2281 |
| 2023/0079124 | A1* | 3/2023 | Srinivasan | G06Q 10/06393 705/7.29 |
| 2023/0297909 | A1* | 9/2023 | Kaplan | G06Q 10/063112 705/7.14 |

OTHER PUBLICATIONS

Scheidt, Scott, and Q. B. Chung. "Making a case for speech analytics to improve customer service quality: Vision, implementation, and evaluation." International Journal of Information Management 45 (2019): 223-232. (Year: 2019).*

Ahmed, Abdelrahman. "Productivity Measurement of Call Centre Agents using a Multimodal Classification Approach." (2021). (Year: 2021).* https://www.verint.com/Assets/resources/resource-types/datasheets/midmarket-quality-management-solutions.pdf, printed on Jul. 15, 2021.

https://www.calabrio.com/wfo/customer-interaction-analytics/, printed on Jul. 15, 2021.

https://www.verint.com/Assets/resources/resource-types/datasheets/quality-management-datasheet.pdf, accessed on Jul. 26, 2022.

https://www.verint.com/Assets/resources/resource-types/datasheets/midmarket-quality-management-solutions.pdf accessed on Jul. 26, 2022.

https://www.verint.com/wp-content/uploads/quality-and-compliance-brochure-us.pdf, accessed on Jul. 26, 2022.

https://www.calabrio.com/products/quality-management/, accessed on Jul. 26, 2022.

https://info.calabrio.com/product-demo/quality-management/, accessed on Jul. 26, 2022.

https://www.calabrio.com/products/quality-management/contact-center-quality-management/, accessed on Jul. 26, 2022.

https://www.calabrio.com/wfo/quality-management/#1568923393531-42ae38e7-e616, accessed on Jul. 26, 2022.

Gutierrez, Jhamela Mae G. et al., "Focused Sampling Orientation: Strategy for Quality Assurance in Company XYZ." Proceedings of the International Conference on Industrial Engineering and Operations Management, 2022.

* cited by examiner

300

SYSTEM AND METHOD FOR QUALITY PLANNING DATA EVALUATION USING TARGET KPIs

FIELD OF THE INVENTION

The present invention relates generally to processing data describing quality planning, in particular to quality planning using key performance indicators (KPIs).

BACKGROUND OF THE INVENTION

The job of a quality manager is to ensure their team achieves quality targets. Quality targets can be key performance indicators (KPIs) set by the upper management to measure quality delivered by contact centers to customers. For example, in the context of a contact center, it may be desired that the average hold time of the team should be less than 2 minutes, and/or the average handling time of the team should be less than 10 minutes.

Technology exists to analyze data resulting from workers, such as interactions a person (such as a customer) has with agents (e.g. people or computerized processes). Interactions or sessions may include conversations or exchanges people have, for example a person accessing data via an IVR (interactive voice response) interface, or a customer speaking with customer service agents or sales agents, for example agents at credit card companies, banks, or retailers. Computerized or computer-aided analysis may help supervisors or analysts identify and analyze patterns in interaction data, and patterns which result in good or bad results for people participating in the interactions. For example analysis of such patterns may be used to determine patterns within interactions result in good or bad customer experience.

The quality of service provided by a team of agents may be monitored by evaluating a subset of the calls or other interactions they send or receive. Identifying which interactions to evaluate can be a burdensome task. Existing solutions rely on static filters, chosen manually by the quality manager and which are not responsive to changes, e.g. improvements, in team behavior.

SUMMARY

According to one or more embodiments a computer implemented method for monitoring a quality of interactions includes: receiving, for each of a plurality of interactions, one or more quality metrics, each quality metric corresponding to at least one of one or more quality targets, each quality target including a desired value; determining, on a periodic basis, a current quality value for each of the one or more quality targets; calculating a deviation of the current quality value from the corresponding desired value of the quality target; weighting the one or more quality targets according to the calculated deviation; and determining a set of one or more interactions for review based on one or more quality metric deviations and the weighted quality targets.

According to some embodiments, the method includes automatically reviewing the set of one or more interactions by applying at least one of a speech to text conversion engine and a text analysis engine, to identify at least one quality issue in the set of one or more interactions.

According to some embodiments, the one or more quality metrics include at least one of: average handling time; hold time; average response time; inactivity time; and agent sentiment.

According to some embodiments, the one or more quality targets correspond to at least one of: interaction direction, and interaction type.

According to some embodiments, the interaction direction includes at least one of incoming and outgoing, and wherein the interaction type includes at least one of: call, digital chat, short message service (SMS) text, and email.

According to some embodiments, the set of one or more interactions to review includes a ranked list of interactions.

According to some embodiments, the one or more quality metrics are received with a predetermined frequency corresponding to a frequency of interactions.

According to one or more embodiments, a computer implemented method for continuously monitoring key performance indicator (KPI) targets across a plurality of communications includes: periodically: receiving one or more metrics evaluating a communication of the plurality of communications, each metric corresponding to one of one or more KPI targets; calculating a current value of each of the one or more KPI targets and a deviation of the current value from the corresponding KPI target; weighting the one or more KPI targets according to the calculated deviation; and determining one or more communications of the plurality of communications for further evaluation based on the one or more metrics and the weighted KPI targets.

automatically evaluating the one or more determined communications by applying at least one of a speech to text conversion engine and a text analysis engine, to identify at least one issue in the one or more communications.

According to some embodiments, a communication of the plurality of communications includes at least one of: call, digital chat, short message service (SMS) text, and email.

According to some embodiments, the determined one or more communications of the plurality of communications for further evaluation includes a ranked list of communications.

According to some embodiments, the one or more metrics are received with a predetermined frequency corresponding to a frequency of communications.

According to some embodiments, the one or more KPI targets correspond to at least one of: average handling time; hold time; average response time; inactivity time; and agent sentiment.

According to one or more embodiments, a system for monitoring a quality of interactions, the system includes: at least one processor; and a memory containing instructions, which, when implemented by the at least one processor causes the processor to: receive, for each of a plurality of interactions, one or more quality metrics corresponding to at least one of one or more quality targets, each quality target comprising a desired value; determine, on a periodic basis, a current quality value for each of the one or more quality targets; calculate a deviation of the current quality value from the corresponding desired value of the quality target; weight the one or more quality targets according to the calculated deviation; and determine a set of one or more interactions for review based on one or more quality metric deviations and the weighted quality targets.

According to some embodiments, the system includes at least one of a speech to text conversion engine and a text analysis engine, each executed by the at least one processor and each configured to automatically review the set of one or more interactions to identify at least one quality issue in the set of one or more interactions.

According to some embodiments, the one or more quality metrics comprises at least one of: average handling time; hold time; average response time; inactivity time; and agent sentiment.

According to some embodiments, the one or more quality targets corresponds to at least one of: interaction direction, and interaction type.

According to some embodiments, the interaction direction comprises at least one of incoming and outgoing, and wherein the interaction type comprises at least one of: call, digital chat, and email.

According to some embodiments, the set of one or more interactions to review comprises a ranked list of interactions.

According to some embodiments, the one or more quality metrics are received with a predetermined frequency corresponding to a frequency of interactions.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

Figure 1A:
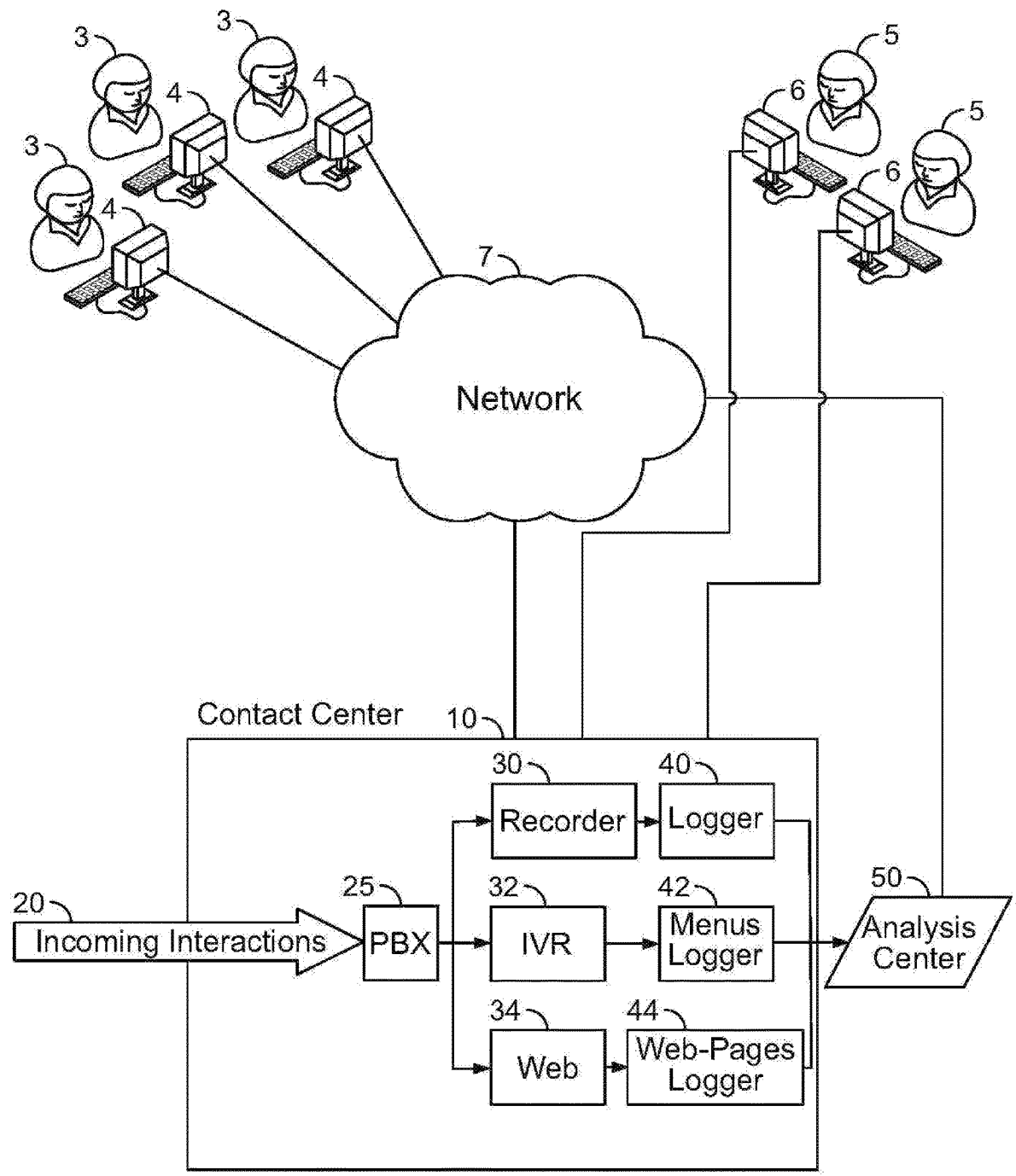
FIG. 1A is a block diagram of a system for recording and analyzing interaction data according to an embodiment of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

As used herein, "Call Center" may refer to a centralized office used for receiving or transmitting a large volume of enquiries by telephone. An inbound call center may be operated by a company (e.g. a tenant) to administer incoming product or service support or information enquiries from consumers.

As used herein, "Contact Center" may refer to a call center which handles other types of communications or interactions other than voice telephone calls, for example, email, message chat, SMS (short message service), etc. Reference to call center should be taken to be applicable to contact center.

As used herein, "Interaction" may refer to a communication between an agent and a customer, and may include, for example, voice telephone calls, email, web chat, SMS, etc.

As used herein, an "Agent" may be a contact center employee that answers incoming interactions, handles customer requests and so on.

As used herein, a "Customer" may be the end user of a contact center. They may be customers of the company that require some kind of service or support.

As used herein, "Volume" may refer to a number of interactions coming into a contact center.

As used herein, "Quality Metrics" or "Service Metrics" may refer to a value quantifying/characterizing key performance indicators (KPIs) designed to evaluate the experience of the contacting customers and the quality of service provided to them, in terms of work force and agent availability. These KPIs may include average handling time, average speed of answer, service level agreement, customer latency, inactivity time, silence time, agent sentiment (positive and/or negative) and customer sentiment (positive and/or negative) amongst others. A quality metric may be a measured value of a KPI, calculated from an interaction, for example 10 minutes for average handling time, 30 seconds for average speed of answer, and 80% positive for customer sentiment. Each user may select the KPIs that are important for their contact center and may define values (e.g. desired values) based on their preferences. These may be referred to as "Quality Targets" in the sense that they represent a required value of a KPI to be achieved by a team of agents, where progress is measured by way of quality metrics extracted from interactions.

As used herein, "Average Handling Time (AHT)" may refer to the average time from start to finish that an agent spends handling an interaction.

As used herein, "Customer Latency" may refer to a measure describing how long on average a customer takes to respond to an agent after the agent has replied.

As used herein, "Wait Time" or "Average Speed of Answer (ASA)" may refer to a quality metric used for voice calls detailing how long customers waited until their call was picked up by an agent.

As used herein, "Service Level Agreement (SLA)" may refer to a KPI, similar to ASA. A service level agreement may allow a user to define a percentage of users answered within a selected time frame, e.g. 30 minutes.

As used herein, "Customer/Agent Sentiment" may refer to ratings or evaluations which are outcomes of an analysis performed on the interaction, for example a text analysis performed on a transcript of a call. A sentiment may be given as a value following such analysis, such as a percentage: for example 60% customer positive sentiment. A customer positive sentiment may be an indication that the customer is happy and satisfied with the interaction. A negative customer sentiment may indicate dissatisfaction or unhappiness of the customer. An agent positive sentiment may be an indication that the approach of the agent handling the interaction was friendly and helpful towards the customer. An agent negative sentiment may be an indication that the agent handling the interaction became angry or irritated towards the customer.

As used herein, a "plan", "quality plan", or "target focused quality plan" may refer to a set of one or more quality targets and corresponding desired values defined by a human quality manager for a team of agents. A quality manager may create plans using a user interface and may enter, select, or otherwise submit data describing one or more quality targets, each quality target having a desired value. A plan may include a number of interactions to be evaluated on a periodic basis, for example 50 interactions a month.

FIG. 1A is a block diagram of a system for recording and analyzing interaction data according to an embodiment of the present invention. While FIG. 1A shows a system creating and recording interactions or sessions at a contact center, interactions can be created in other ways. While examples are given in the context of evaluating agents and interactions, embodiments of the invention may be used in the context of other environments, such as evaluating workers not at a call center. While data describing interactions is described herein, in other embodiments work product other than interactions may be evaluated. Incoming interactions 20 among people 3 (e.g., telephone calls, emails, web chat, Interactive Voice Response (IVR) interactions, etc.) and agents 5 may enter a contact center 10 and be routed for example by a PBX (private branch exchange) 25 or other equipment to relevant systems, such as interactive voice response (IVR) block or processor 32, Internet sessions or web block 34 and voice interactions block or recorder 30. People 3 may operate user equipment 4 to communicate with agents 5 via contact center 10; and agents 5 may operate agent terminals 6 for that communication and other purposes.

Contact center 10 may be for example maintained or operated by a company (e.g. a bank, a store, an online retailer), government or other organization. Interaction data may be stored, e.g., in files and/or databases: for example logger 40, menus logger 42, and web-page logger 44 may record information related to interactions, such as the content or substance of interactions (e.g. recordings and/or transcripts of telephone calls), metadata (e.g. telephone numbers used, customer identification (ID), etc.), and quality metrics. The data from contact center 10 may be output, sent or exported to an analysis center 50, typically periodically, e.g. once a day. Analysis center 50 may be part of contact center 10, or external to and/or remotely located from contact center 10. The transfer may be via for example SFTP (Secure File Transfer Protocol) but may be via other methods.

One or more networks 7 may connect equipment or entities not physically co-located, for example connecting user equipment 4 to contact center 10, and contact center 10 to analysis center 50. Networks 7 may include for example telephone networks, the Internet, or other networks. While in FIG. 1A contact center 10 is shown passing data to analysis center 50, these entities may communicate via a network such as networks 7.

Web block 34 may support web interactions over the Internet (e.g. operate web pages which may be executed in part on user equipment), IVR block 32 may provide menus and other information to customers and for obtaining selections and other information from customers, and recorder 34 may process or record voice sessions with customers. It may be appreciated that contact center 10 presented in FIG. 1A is not limiting and may include any blocks and infrastructure needed to handle voice, text (SMS (short message service), WhatsApp messages, chats, etc.) video and any type of interaction with costumers.

Figure 1B:
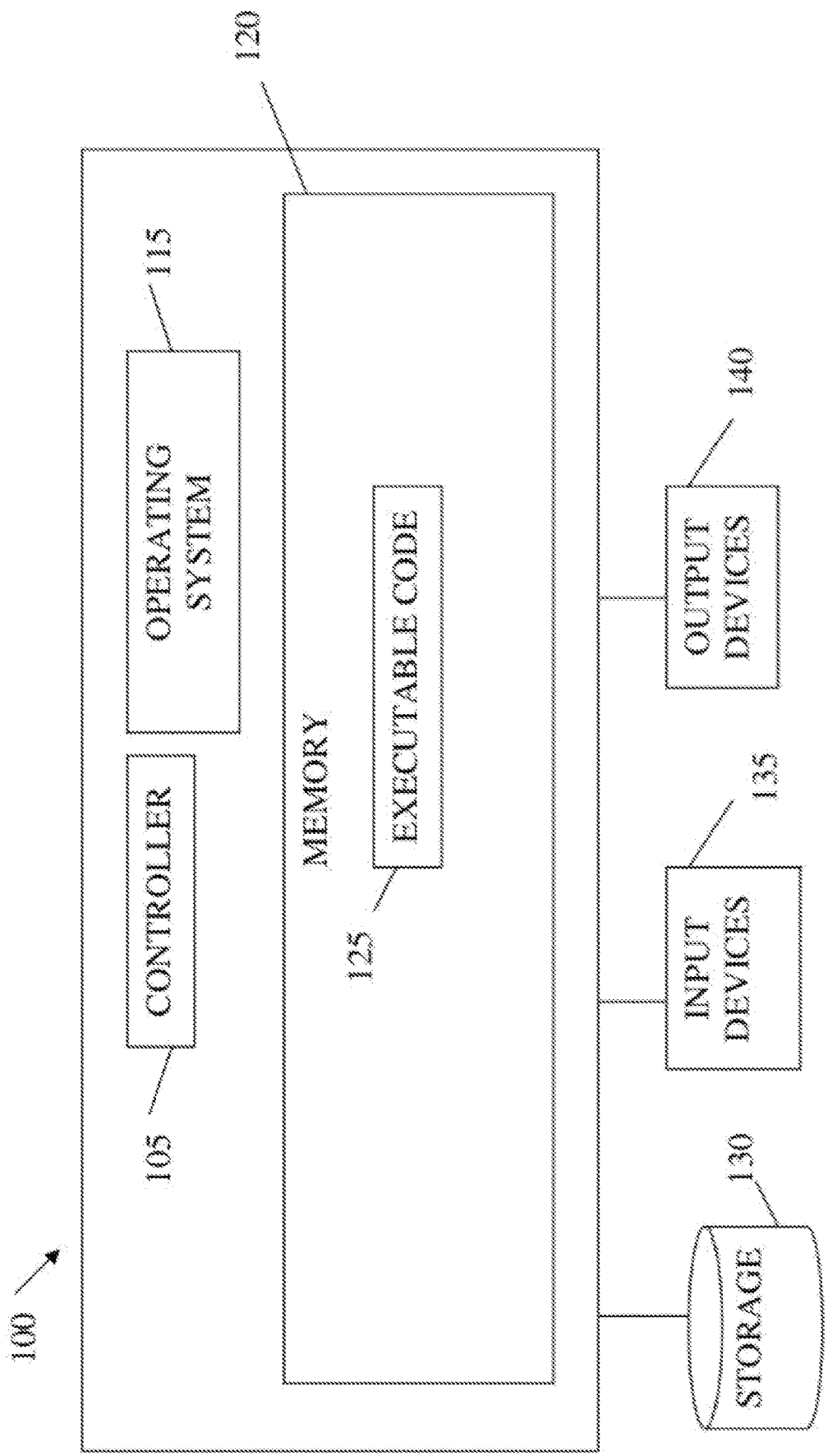
FIG. 1B is a block diagram of a system according to an embodiment of the present invention.

User equipment 5 and agent terminals 6 may include computing or telecommunications devices such as personal computers or other desktop computers, conventional telephones, cellular telephones, portable or tablet computers, smart or dumb terminals, etc., and may include some or all of the components such as a processor shown in FIG. 1B.

The data exported to analysis center 50 may be formatted, extracted and/or normalized to be data that represents features of interactions, such as quality metrics characterising attributes of the interaction. Data may be stored in various formats, such as one tuple, representing an interaction session, per row, or other formats. Interactions may include or be associated with other data, such as metadata describing the customer identification, channel identification (e.g. telephone number), start and/or stop time, duration in time of the interaction, or other data. While the creation or extraction of data from various interactions may be performed by contact center 10, such data may be created or extracted by another entity such as analysis center 50. In other embodiments, interactions may be represented with other or more information. For example, an interaction may be a vector of features based on the actual interaction such as the start time, end time, customer ID, channel, contact reason, etc.

FIG. 1B shows a high-level block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or data such as interactions, KPIs, etc.

Executable code 125 may be any application, program, process, task, or script. Executable code 125 may be executed by controller 105 possibly under control of operating system 115. For example, executable code 125 may be or execute one or more applications performing methods as disclosed herein, such as selecting interactions or other work product for review. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

Figure 2A:
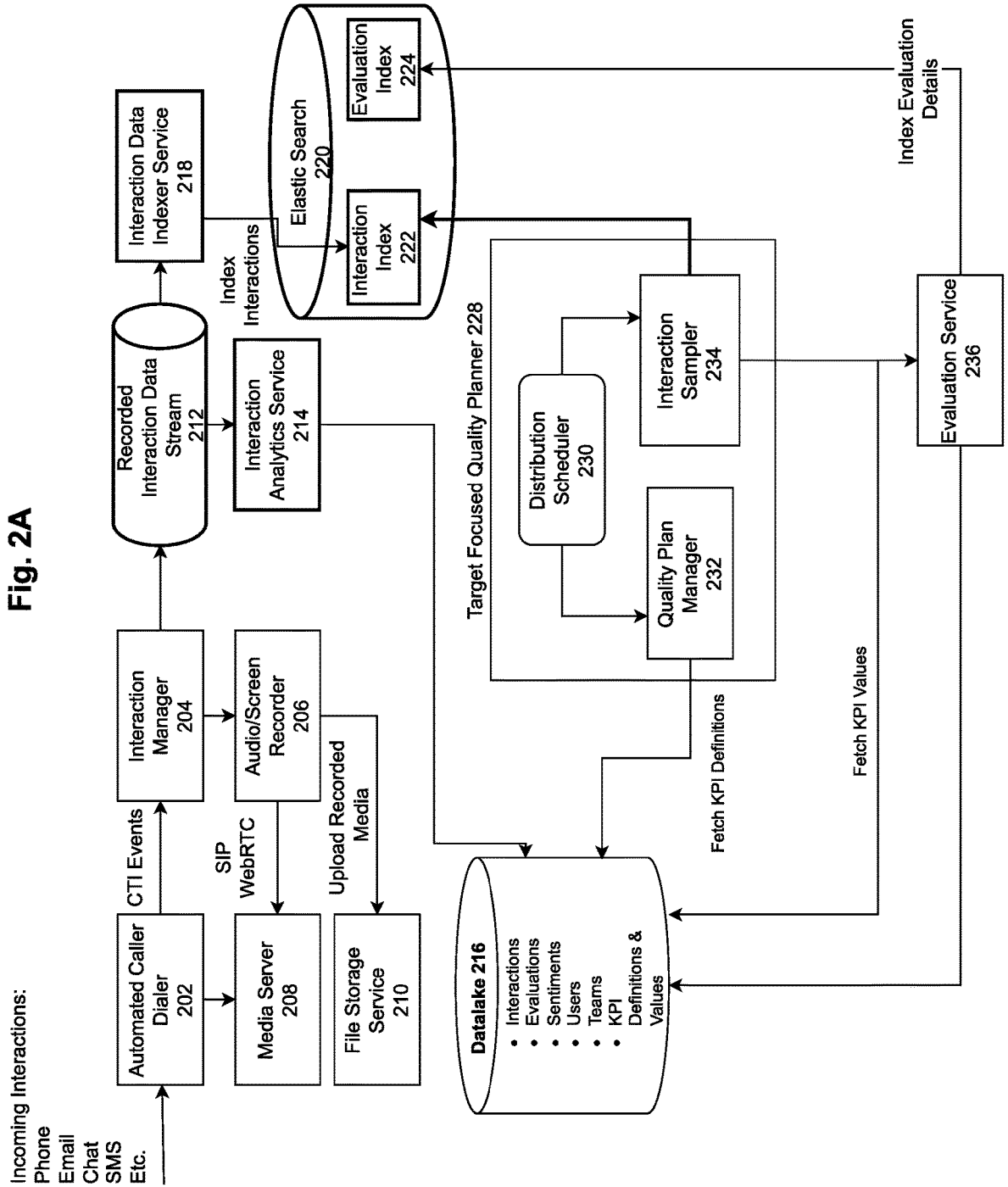
FIG. 2A is a block diagram of a system, according to some embodiments of the invention.

FIG. 2A shows a block diagram of a system, according to some embodiments of the invention. According to some embodiments, the system receives incoming interactions. These interactions may be, for example, phone, email, chat (e.g. chat such as Facebook® social media chat, Twitter® social media chat, Instagram® social media chat or other chat), and SMS. The interactions may be the same or similar as interactions 20 received in FIG. 1A.

According to some embodiments, a system includes an automated caller dialer (ACD) 202. ACD 202 may accept incoming calls or digital interactions and route them to agents, such as agents ACD 202 may facilitate outbound calls from agents 5 to customers 3.

A system may include an interaction manager 204, programmed/configured to process interactions. In some embodiments, ACD 202 may send CTI (computer telephony integration) events/interactions to the interaction manager 204. Interaction manager 204 may co-ordinate a recording flow (e.g. manage a recording of the interaction) according to the interactions that it receives from the ACD system e.g. connect, holds, transfers, disconnects etc. Interaction manager 204 may generate metadata packets associated with the interactions and send them to the recorded interaction data stream after the interaction is complete (e.g. upon disconnect).

According to some embodiments, the system includes an audio/screen recorder 206, which may record interactions. For example, if the interaction is a telephone call, audio/screen recorder 206 may record an audio of the call. In some embodiments, a speech to text algorithm may be used to extract text from an audio recording, for example in order to generate a transcript of the recorded interaction. In another example, if the interaction is a digital chat session, such as a chat using social media, audio/screen recorder 206 may record a screen of a computing device such as an agent terminal 6 used by an agent 5 during the interaction. In some embodiments, an optical character recognition algorithm may be used to extract text from a screen recording, for example in order to generate a transcript of the recorded interaction.

Interaction manager 204 may control audio/screen recorder 206. For example, interaction manager 204 may send an instruction to audio/screen recorder 206 to initiate recording upon connection of the interaction, and may instruct audio/screen recorder 206 to pause the recording during a hold. In some embodiments, interaction manager 204 sends interactions to audio/screen recorder 206 using session initiation protocol (SIP) and/or web real-time communication (WebRTC).

According to some embodiments, the system includes a media server 208. Media server 208 may be a streaming server for the audio of the telephony, for example connecting the agent and customer and allowing communication using SIP/WebRTC.

According to some embodiments, the system includes a file storage service 210. File storage 210 may be a scalable distributed storage device. Audio/screen recorder 206 may upload recorded media to the file storage service.

According to some embodiments, the system includes a recorded interaction data stream 212. Data stream 212 may be a data streaming solution based on, for example, the Amazon Kinesis solution or the Apache Kafka solution. Data stream 212 may generally be used in a distributed microservices architecture to pass data/events within different components.

According to some embodiments, the system includes an interaction analytics service 214. Interaction analytics service 214 may analyze interactions and extract data therefrom, for example extract one or more quality metrics characterising the quality of the interaction. Functions and tasks performed by interaction analytics service 214 may be performed by an analysis center 50 as shown in, and described with reference to, FIG. 1A.

According to some embodiments, the system includes a datalake 216 which may be a database and may store data in a structured way. Datalake 216 may receive interaction analytics data, such as quality metrics, from interaction analytics service 214 and may store such received analytics data. In some embodiments, datalake 216 may store, for example: interactions, evaluations, sentiments, users, teams, quality metric values and/or key performance indicator definitions and values. According to some embodiments, various other contact center services, applications and systems store data in datalake 216, such as KPI data. The data stored in datalake 216 may be used by services/modules of the system in order to calculate average KPI per team for different KPI/quality metrics like AHT, hold time, silence, sentiments, etc.

According to some embodiments, the system may include an interaction data indexer service 218. Interaction data indexer service 218 may upload interaction metadata to an Elastic Search Index 220 which may make this information searchable for the applications. In some embodiments, elastic search index 220 may be replaced by an open source alternative, such as Open Search.

Elastic search index 220 may include interaction index 222, which may store interactions and may allow a search over multiple attributes to be performed on the stored interactions.

Elastic search index 220 may include evaluation index 224, which may store evaluated interactions and/or outcomes of an evaluation for an interaction and may allow a search over multiple attributes to be performed on the data stored therein.

According to some embodiments, the system includes a target focused quality planner (TFQP) 228. TFQP 228 may monitor a quality of interactions. TFQP 228 may execute methods disclosed herein for monitoring a quality of interactions. TFQP 228 is described in further detail with respect to FIG. 2B.

According to some embodiments, TFQP 228 may include a distribution scheduler 230. Distribution scheduler 230 may determine how frequently plans should be analyzed, how frequently interactions should be sent for review, and how many interactions should be sent for review. In some embodiments, distribution scheduler 230 analyses plans every four hours.

According to some embodiments, TFQP 228 includes a quality plan manager 232. Quality plan manager 232 may create and manage (e.g. Create, Read, Update, and Delete "CRUD") one or more quality plans based on received data describing one or more quality targets, and desired values/thresholds for each target. According to some embodiments, the data is received by input from a human user, for example a team leader tasked with overseeing the setting and upholding of interaction quality targets for a team of contact center agents. According to some embodiments, quality plan manager 232 fetches (e.g. pulls or otherwise retrieves) KPI definitions (such as quality targets and desired values) from datalake 216.

According to some embodiments, TFQP 228 includes an interaction sampler 234. Interaction sampler 234 may sample interactions, for example stored audio/screen recordings of interactions stored in datalake 216 and/or file storage service 210. Interaction sampler 234 may be a target focused interaction sampler which samples interactions based on one or more underperforming quality targets as received from quality plan manager 232. For example, quality plan manager 232 may send an instruction to interaction sampler 234 to sample interactions which have a low associated quality metric value, such as poor average handling time in excess of 30 minutes. Interaction sampler 234 may fetch KPI values (e.g. target desired values) from datalake 216 in order to sample underperforming, "low quality"/"bad" interactions. Interaction sampler 234 may sample interactions with a frequency determined by distribution scheduler 230. For example, in one embodiment, interaction sampler 234 samples interactions every four hours. It will be understood that any time period or temporal frequency may be used by interaction sampler, for example measured in units of seconds, minutes, hours, days, weeks or months. Interaction sampler 234 may access interaction index 222 and search for interactions satisfying one or more generated sampling criteria.

According to some embodiments, the system may include an evaluation service 236. Evaluation service 236 may receive sampled interactions from interaction sampler 234. Evaluation service 236 may evaluate the received sampled interactions, for example in order to generate a report evaluating the performance of the agent/team which handled the sampled interactions. Evaluation service 236 may use automated algorithms known in the art for evaluating interactions.

Figure 2B:
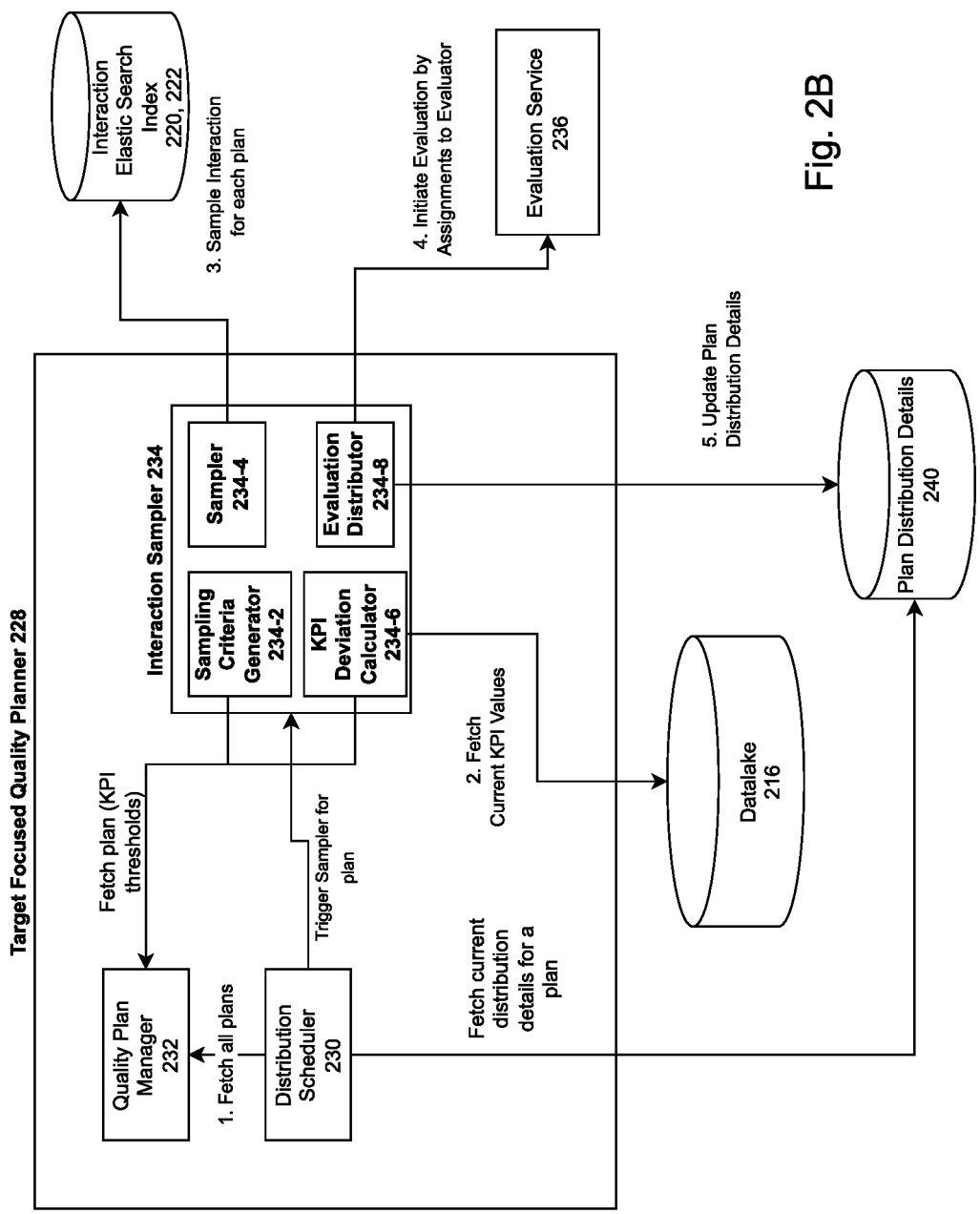
FIG. 2B is a block diagram of a system, according to some embodiments of the invention.

FIG. 2B is a block diagram showing a "focused" view of target focused quality planner (TFQP) 228 shown in FIG. 2A. TFQP 228 may include distribution scheduler 230, quality plan manager 232 and interaction sampler 234.

According to some embodiments, interaction sampler 234 includes a sampling criteria generator 234-2, a sampler 234-4, a KPI deviation calculator 234-6, and/or an evaluation distributor 234-8.

According to some embodiments, distribution scheduler 230 may fetch all plans (e.g. data describing one or more quality targets, each quality target comprising a desired value) ready for distribution (e.g. ready to be distributed to evaluators for evaluation/review). Whether a plan is ready or not for distribution may be determined by a predefined frequency; for example, all plans may be checked every four hours. Distribution scheduler 230 may fetch or otherwise retrieve (e.g. using an application programming interface "API" call) plans from quality plan manager 232. As shown in FIG. 2A, quality plan manager may fetch KPI definitions from datalake 216.

According to some embodiments, distribution scheduler 230 may fetch the current distribution details for each plan. For example, a plan may relate to five evaluating agents (e.g. five evaluators evaluate interactions handled by the team for which the plan was generated) and may specify a requirement of distributing 50 interactions per evaluator to review on a monthly basis. Distribution scheduler 230 may fetch or otherwise retrieve (e.g. using an API call) distribution details from a store of plan distribution details 240, which may be included, for example, in datalake 216.

According to some embodiments, distribution scheduler 230 may trigger interaction sampler 234 for a particular plan, e.g. send an instruction to interaction sampler 234 to sample interactions according to the plan.

According to some embodiments, sampling criteria generator 234-2 and KPI deviation calculator 234-6 may fetch the plan (e.g. quality target desired values) from quality plan manager 232 and/or datalake 216.

According to some embodiments, KPI deviation calculator 234-6 may fetch current KPI values (e.g. current quality values) from datalake 216. Current KPI values may be values calculated as representing a current average value of the underlying KPI across all interactions handled by the team corresponding to the plan. According to some embodiments, KPI deviation calculator 234-6 calculates the deviation of the KPI average values for the teams included on a plan with respect to the defined KPI targets of the plan. Example equations for this calculation are described herein. This process may be done periodically, e.g. once each day, for example at the beginning of the day. Calculating such a deviation of the average current value from the target value once per day may be sufficient, according to some embodiments. The KPI deviations calculated on a daily basis may be used to sample interactions for all runs on the same day. KPI deviation calculator 234-6 may calculate the deviation for each target KPI by comparing the defined target threshold and the current KPI values. KPI deviation calculator 234-6 may then prioritize (e.g. using a weighting described herein) and sort the KPIs that are deviated the most, e.g. the most deviated KPIs are at the top of the list while the least or non-deviated KPIs are at the bottom of the list. The calculations and sorting performed by KPI deviation calculator 234-6 are explained in more detail herein with reference to FIG. 3 and Tables 1-10.

According to some embodiments, sampling criteria generator 234-2 generates criteria used for sampling interactions based on the retrieved plan. Sampling criteria generator 234-2 may generate one or more filters with which to identify "good" interactions satisfying a quality target desired value and "bad" interactions failing a quality target desired value. For example, if a plan specifies a quality target of average handling time with a desired value of 10 minutes, then sampling criteria generator 234-2 may generate a filter which differentiates between those interactions lasting less than 10 minutes and those interaction lasting 10 minutes or more. According to some embodiments, generating sampling criteria is performed independently of the calculations performed by KPI deviation calculator 234-6.

According to some embodiments, sampler 234-4 samples interactions for each plan. The sampling may be based on the sampling criteria (e.g. filters) generated by sampling criteria generator 234-2. Sampler 234-4 may utilize elastic search 220 and access interaction index 222. Sampler 234-4 may run queries on the elastic search index 222 to fetch interactions using the filters prepared by the sampling criteria generator 234-2. For Each KPI, sampler 234-4 may fetch the matching interactions according to the filter. These interactions caught by the filters may be referred to as "bad" interactions which do not meet the KPI quality target defined in the plan (e.g. do not meet the desired value of the quality target). According to some embodiments, and described in detail with reference to FIG. 4, sampler 234-4 saves all matching bad interactions identified for each KPI in an in-memory list. For each KPI the sampler 234-4 may calculate the KPI deviation according to methods described herein and use the calculated deviation to create a quantile distribution of four buckets/bins based on the degree of deviation. Sampler 234-4 may calculate the sum total of deviations per interaction from the various in-memory lists and create a final distinct list/set of one or more interactions that deviate most on all KPIs defined in the plan. The sampler may then choose a predefined number of interactions from the top of the list according to deviation (e.g. 10) and create a final list/set.

According to some embodiments, evaluation distributor 234-8 may initiate an evaluation by sending assignments to evaluation service 236. According to some embodiments, evaluation distributor 234-8 receives a final list of interactions created by sampler 234-4 and distributes the interactions on the list by evenly distributing them among the available evaluators.

According to some embodiments, evaluation distributor 234-8 may update plan distribution details 240, for example using CRUD techniques known in the art. For example, evaluation distributor 234-8 may update the plan distribution details 240 with the interaction ID, agent ID, evaluator ID and date of distribution.

Figure 3:
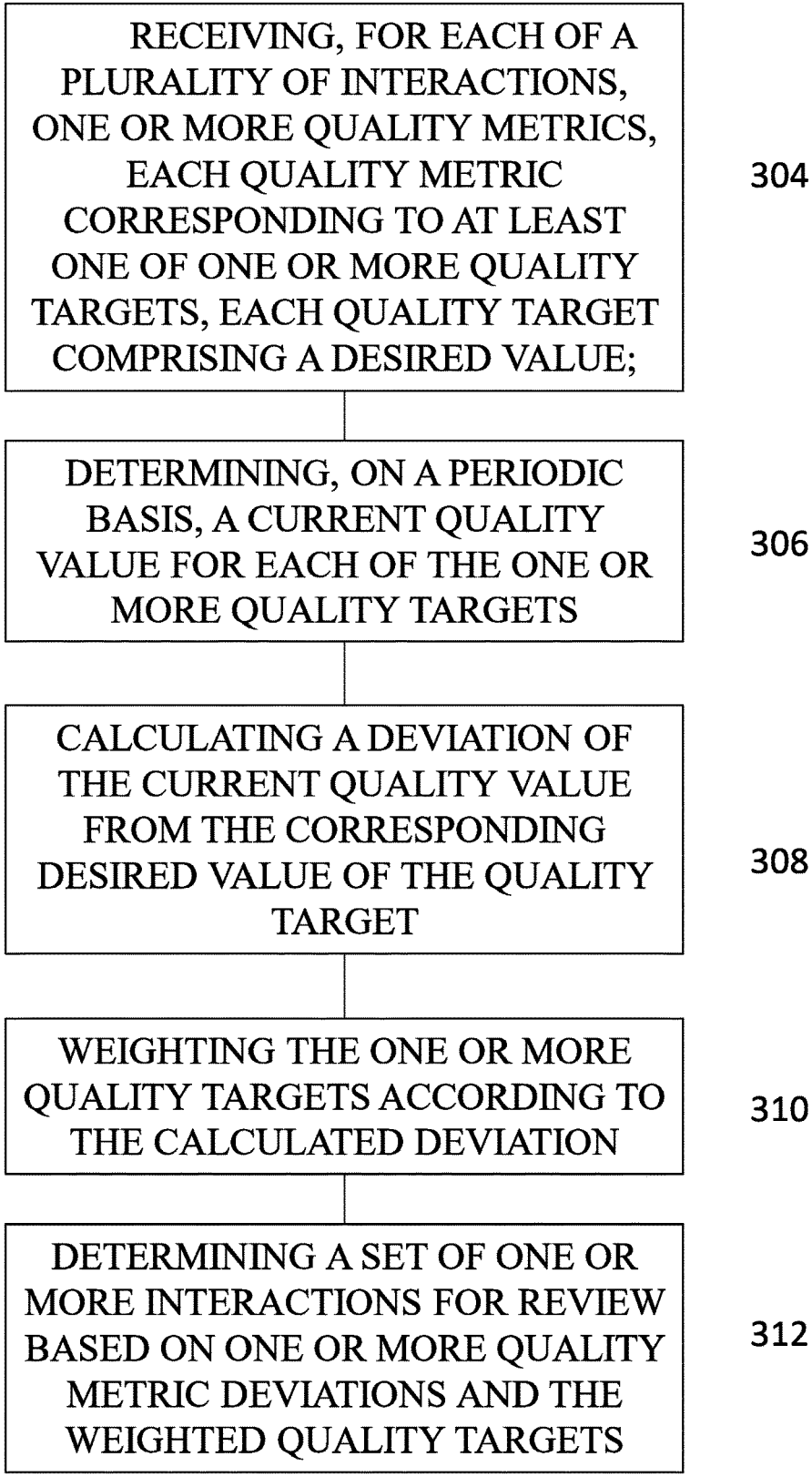
FIG. 3 is a flowchart of a method, according to some embodiments of the invention.

FIG. 3 shows a flowchart of an example computer implemented method 300 for monitoring a quality of work product or data describing work product such as interactions, according to some embodiments of the invention. Method 300 may be executed by one or more components shown in FIGS. 1A, 1B, 2A and/or 2B.

Method 300 may include receiving (304), for each of a plurality of work product items such as interactions, one or more quality metrics, each quality metric corresponding to at least one of one or more quality targets, each quality target comprising a desired value.

An interaction may be, for example, a call (e.g. telephone call with voice), email, text message (e.g. Short Message Service SMS), and/or web chat.

A quality metric, or service metric, may include data, statistics, attributes and/or measurements relating to and/or characterising an interaction. For example, quality metrics corresponding to an interaction may include at least one of: interaction duration, hold time, silence time, agent sentiment, customer sentiment, and/or customer satisfaction (CSAT) score.

A quality target may relate to key performance indicators and/or service metrics such as average handling time and average wait time. Each quality target may have a desired value, for example a received quality target for average handling time may have a desired value of 10 minutes, representing that contact centre agents are expected to complete their interactions in 10 minutes on average. The received data may include, for example, a JSON document. Receiving the data may include receiving data submitted and/or selected using a user interface, such as defining a desired value for the quality target. For example, a quality target relating to average wait time may take a value of 1 minute, representing the desired value of average wait time to be achieved.

A quality metric may correspond to a quality target by relating to the same key performance indicator: for example, for a particular interaction, the quality metric "interaction duration" with a value of 7 minutes, 33 seconds may correspond to a quality target of average handling time because both the quality metric and quality target relate to a same or similar characteristic of the interaction, and the quality metric can be used to determine how close to the desired value of the quality target the interaction was, e.g. was the interaction high or low quality. Continuing with this example, if the quality target for average handling time was set to a desired value of 10 minutes, then this interaction of 7 minutes, 33 seconds may be considered a high quality interaction because the interaction was handled in less time than the desired average. It will be understood that the quality of an interaction is generally evaluated over more than one quality target: for example, quality metrics relating to a low customer satisfaction score for the interaction of 7 minutes, 33 seconds may reduce the evaluated quality of the interaction from high quality to low quality.

Quality metrics may be received with a predetermined frequency corresponding to the frequency of interactions. For example, quality metrics may be received after each interaction. In some embodiments, interactions may be stored or recorded, for example by logger 40 shown in FIG. 1A and/or audio/screen recorder 206 shown in FIG. 2A, and quality metrics may be extracted or derived from the interaction at a later date.

According to some embodiments, the one or more quality targets correspond to at least one of: interaction direction, and interaction type. An interaction direction may relate to whether the interaction is incoming (e.g. from devices 4 of customers 3 to devices 6 of agents 5) or outgoing (e.g. from devices 6 of agents 5 to devices 4 of customers 3). An interaction type may relate to whether the interaction is a call, digital/web chat, email, SMS message etc.

Method 300 may include determining (306), on a periodic basis, a current quality value for each of the one or more quality targets. A periodic basis over which to perform the determining may be predefined by a user, for example by setting a value using a user interface. The periodic basis may be, for example, every four hours, once a day, once a week, etc. A current quality value may be a determined value of how close the received quality metrics are to the received quality targets. A current quality value may represent an average value of a quality metric across multiple interactions within the time frame of the periodic basis, for example those interactions received since the last determination was made. In other words, a current quality value may be an average (e.g. mean) of all the values for the team for the selected period. In this way a current quality value may change on a periodic basis in response to changes in team behavior. For example, for a received quality target of 10 minutes for AHT, a determined current quality value on Monday may be 11 minutes, whereas a determination of the current value for AHT made on Tuesday may be 8 minutes. A current quality value may be recorded or stored for analysing historic data and trends over time.

Method 300 may include calculating (308) a deviation of the current quality value from the corresponding desired value of the quality target. According to some embodiments, the way in which the deviation is calculated depends on whether a lesser current value than the desired value is better for the underlying KPI or whether a greater current value than the desired value is better for the underlying KPI. For example, for the KPI average handling time, a lesser current value than the desired value is better, because this indicates that interactions are being handled in less time than the set target/desired value. Conversely, for a KPI such as CSAT score, a greater current value than the desired value is better, because this indicates that customers are more satisfied than the target level of satisfaction. A deviation may be calculated using the example equations (other equations may be used):

For *KPIs* which are better when the value is greater:

$$\% \ KPI \ \text{Deviation} = \frac{\text{Current quality value} - \text{Desired value}}{\text{Desired value}} \times 100 \quad \text{EQN. 1}$$

For *KPIs* which are better when the value is lesser:

$$\% \ KPI \ \text{Deviation} = \frac{\text{Desired value} - \text{Current quality value}}{\text{Desired value}} \times 100 \quad \text{EQN. 2}$$

The resulting deviation is dimensionless (e.g. without units) and may be positive or negative. Method 300 may include weighting (310) the one or more quality targets according to the calculated deviation. Weighting may allow to identify those quality targets/KPIs which are deviating most from the desired target value, which may improve and adapt call sampling for evaluation. Weighting may also reduce any manual effort required of quality assurance administrators (e.g. quality managers) in tracking the most deviating quality KPIs and manually adjusting sampling criteria (e.g. defining new filters).

According to some embodiments, the weighting includes assigning each KPI a weighting value, which may be a numeric value such as 1, 2, 3, 4, etc. The weighting may include multiplying the percentage KPI deviation by the numeric value. The numeric value may depend on a number of quality targets/KPIs being considered. The weighting may include multiplying the highest value of percentage KPI deviation (e.g. the most deviating KPI) by a higher weight, such as 4, and multiplying the smallest value of percentage KPI deviation by a smaller weight, such as 1.

Method 300 may include determining (312) a set of one or more interactions for review based on one or more quality metric deviations and the weighted quality targets. An equation, such as EQN. 3 or 4 herein may be used; other equations may be used. The interactions for review may be interactions received since the last determining 312, for example interactions received within the time frame of the periodic basis for the determining 308. Interactions may be stored for this purpose, for example by logger 40 shown in FIG. 1A.

Determining 312 may include identifying (e.g. sampling) the interactions with quality metrics which are the most deviated. Interactions may be binned (e.g. sorted in groups, "bins" or "buckets") of how deviated they are for a given KPI/quality target. The number of times an interaction appears across buckets may be stored or recorded.

A predetermined number of most deviated interactions may be selected for evaluation, for example the ten most deviated interactions. A total sum of weighted deviations (e.g. percentage KPI deviation multiplied by the assigned weighting value) may be performed for each interaction in the sample.

In some embodiments the interactions selected for evaluation are divided between "bad" (e.g. deviating negatively such as longer than desired value for AHT) and "good" (deviating positively such as shorter than desired value for AHT) interactions with a distribution of, for example, 80% bad interactions and 20% good interactions.

In some embodiments, the review as part of determining (312) a set of one or more interactions for review may include automatically (e.g. using a computer processor such as shown in FIGS. 1A and 1B) reviewing the set of one or more interactions by applying at least one of a speech to text conversion engine and/or a text analysis engine, to identify at least one quality issue in the set of one or more interactions. For example, having identified the 10 most deviating interactions those interactions may be distributed to analysis center 50 which may use automatic methods to review and evaluate the interactions and identify why the quality metrics for those interactions are deviating from the desired value of the KPI quality target. A report may be automatically generated which includes the findings or outcome of the review. Other evaluation/review methods, such as manual evaluation may be used.

In some embodiments, the set of one or more interactions to review includes a ranked list of interactions, for example ranked or sorted according to how deviating they are. A ranked list may be useful in cases where there are not enough resources available to review or evaluate all of the interactions of the determined set or on the determined list, and instead only the highest ranking interactions or interactions with the greatest priority may be reviewed.

Figure 4:
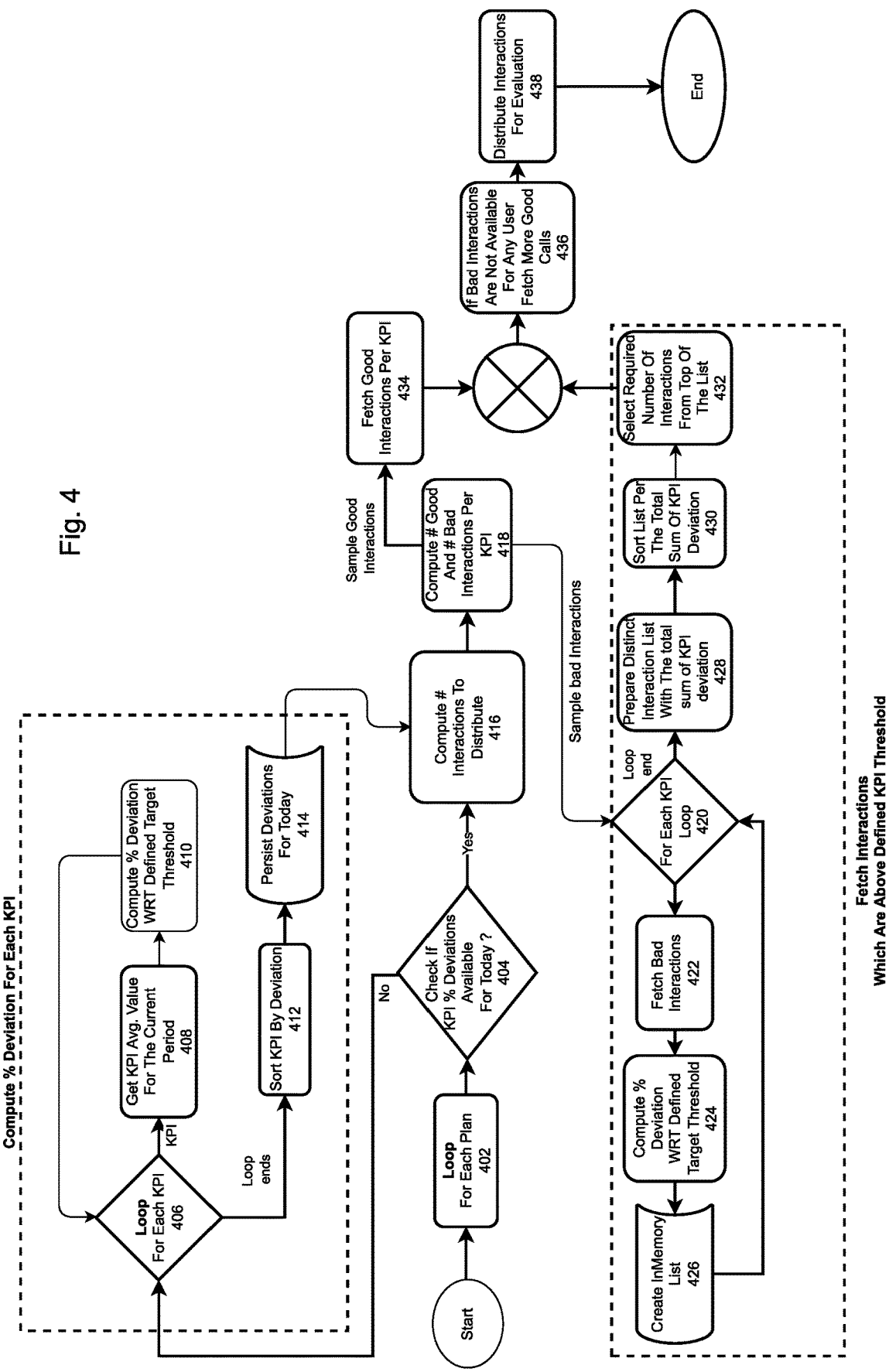
FIG. 4 is a flowchart depicting an algorithm, according to some embodiments of the invention.

FIG. 4 shows a flowchart depicting an algorithm, according to some embodiments of the invention. According to some embodiments, the steps of the algorithm are performed by one or more components depicted in FIGS. 1A, 1B, 2A and/or 2B, but may be performed by other equipment. According to some embodiments, the algorithm is executed periodically, for example multiple times a day with a frequency/periodicity of four hours.

According to some embodiments, the algorithm may loop (402) for each plan. Plans may be retrieved, for example, by interaction sampler 234 from quality plan manager 232 and/or datalake 216. As described, a plan may contain data describing one or more quality targets, each quality target comprising a desired value.

According to some embodiments, the algorithm may query (404) if KPI percentage deviations (e.g. a deviation of the current quality value from the corresponding desired value of the quality target) are available for today (e.g. at the point in time at which the algorithm is executed). Percentage deviations will not be available on the first run of the algorithm of the day.

If the answer at step 404 is no, and KPI percentage deviations are not available for today, then according to some embodiments the algorithm may execute a first sub-algorithm in order to calculate the percentage deviation for each KPI.

According to some embodiments, the first sub-algorithm includes looping (406) for each KPI/quality target. The first sub-algorithm may get (408), e.g. retrieve using an API call, KPI average values for the current period. A KPI average value may represent an arithmetic mean value of quality metrics taken across all interactions handled by the team to which the plan relates. Quality metrics may be stored in datalake 216. According to some embodiments, the first sub-algorithm may compute (410) a percentage deviation of the average KPI value with respect to the defined target threshold (e.g. the desired value of the quality target). Equations 1 and/or 2, or other suitable equations, may be used to perform the computation. According to some embodiments, upon loop 406 ending, the first sub-algorithm may sort (412) the KPIs based on their deviation, for example generating an ordered list with the highest deviating KPI at the top of the list. According to some embodiments, the first sub-algorithm may persist (414), e.g. save in datalake 216, the list of deviations for today.

If the answer at step 404 is yes, and KPI percentage deviations are available for today (for example having already been computed earlier in the day using the first sub-algorithm) then, according to some embodiments the algorithm may compute (416) the number of interactions required to be distributed in accordance with the plan.

According to some embodiments, the algorithm may compute (418) the number of good and bad interactions per KPI. For example, the plan may specify that for each KPI, 80% of the interactions for review should be bad interactions and 20% of the interactions for review should be good interactions.

According to some embodiments, the algorithm may sample bad interactions using a second sub-algorithm for fetching bad interactions which are above defined KPI thresholds (e.g. which do not satisfy desired values of quality targets).

According to some embodiments, the second sub-algorithm may loop (420) for each KPI.

According to some embodiments, the second sub-algorithm may fetch (422), e.g. retrieve via an API call, bad interactions. For example, the second sub-algorithm may apply filters generated by sampling criteria generator 234-2 on the interaction index 222 to retrieve interactions with quality metrics which do not satisfy the desired value of the quality target/KPI being considered.

According to some embodiments, the second sub-algorithm may compute (424) a percentage deviation of the KPI with respect to the defined quality target threshold (e.g. the desired value). EQN. 3 or 4, presented herein, may be used to perform the calculation.

According to some embodiments, the second sub-algorithm may create 426 an in-memory list of the percentage deviations for the KPI. The list may include an interaction ID.

According to some embodiments, upon loop 420 ending, the second sub-algorithm may prepare (428) a distinct interaction list with the total sum of weighted KPI deviations. For example, the second sub-algorithm may generate a list of interactions, with each interaction having an associated value which is the sum of weighted percentage deviations for each KPI.

According to some embodiments, the second sub-algorithm may sort (430) the list of summed deviations per the total sum of KPI deviation. For example, the interaction at the top of the list may be the interaction with the highest total sum of KPI deviation and the interaction at the bottom of the list may be the interaction with the lowest total sum of KPI deviation.

According to some embodiments, the second sub-algorithm selects (432) a required number of interactions from the top of the sorted list. For example, the second sub-algorithm may select the ten topmost interactions from the list, in other words the ten interactions with the highest KPI deviation. The required number of interactions to select from the list may be included in the plan.

According to some embodiments, the algorithm may sample good interactions. The algorithm may sample good interactions at the same time as sampling bad interactions, for example using distributed computed or parallel processing. The algorithm may fetch (434), e.g. retrieve using an API call, good interactions. For example, the algorithm may apply filters generated by sampling criteria generator 234-2 on the interaction index 222 to retrieve interactions with quality metrics which do satisfy the desired value of a quality target/KPI being considered.

According to some embodiments, the algorithm may, having combined/merged outputs from the separate good and bad interaction branches, fetch more good calls (436) if there is an insufficient number of bad interactions. For example, if there are no bad interactions for an agent, then good interactions from the same or any other agent in the team may be used to meet the required number of interactions to be sent for evaluation.

According to some embodiments, the algorithm may distribute (438) the determined set (e.g. one or more) of interactions for review/evaluation. Because of the computations and sorting involved in determining the set of one or more interactions for review, the set is based on one or more quality metric deviations and the weighted quality targets.

According to some embodiments the algorithm may end once each plan has been looped over. According to some embodiments the algorithm repeats for each plan after a predetermined time period, for example, after four hours.

Example

The following example tables of data show how a quality of interactions or other work product items may be monitored.

TABLE 1

| KPI | KPI Type | Defined KPI Threshold Value (e.g. Desired value) |
|---|---|---|
| AHT | Lesser is Better | 240 |
| Hold Time | Lesser is Better | 30 |
| Silence Time | Lesser is Better | 20 |
| CSAT Score | Greater is Better | 60 |

Table 1 shows example received quality targets, received, for example, as part of a quality plan. As discussed herein, a quality target may relate to a KPI and a desired value. The desired value may be a predefined KPI threshold value defined, for example, by a manger of a team of agents. Table 1 also shows the type of KPI, e.g. whether the KPI is one for which a lesser value than the desired value is better or one for which a greater value than the desired value is better.

TABLE 2

| KPI | KPI Type | Defined KPI Threshold Value (e.g. Desired value) | Current Period AVG KPI Value (e.g. Current quality value) |
|---|---|---|---|
| AHT | Lesser is Better | 240 | 264 |
| Hold Time | Lesser is Better | 30 | 42 |
| Silence Time | Lesser is Better | 20 | 16 |
| CSAT Score | Greater is Better | 60 | 51 |

Table 2 shows the average KPI value for the current period (e.g. current quality value). The current quality value may be calculated and/or retrieved according to the outcome of step 404 of the algorithm shown in FIG. 4. For example, if percentage KPI deviations have not already been calculated for the current period they may be calculated according to the first sub algorithm shown in FIG. 4. The data in Table 2 may correspond to step 306 of method 300 shown in FIG. 3.

TABLE 3

| KPI | % KPI Deviation | KPI State |
|---|---|---|
| AHT | −10 | Bad KPI |
| Hold Time | −40 | Bad KPI |
| Silence Time | 20 | Good KPI |
| CSAT Score | −15 | Bad KPI |

Table 3 shows calculated/retrieved percentage KPI deviations for the example data shown in Table 2. The deviations may be calculated using EQN. 1 or 2, depending on the KPI type. Other equations may be used. The KPI state shown in Table 3 may indicate whether, based on the calculated deviation, the corresponding KPI is currently overperforming (e.g. good) or underperforming (e.g. bad) with respect to the defined target/desired value. The data in Table 3 may correspond to step 308 of method 300 shown in FIG. 3.

TABLE 4

| KPI | % KPI Deviation | KPI State |
|---|---|---|
| Silence Time | 20 | Good KPI |
| AHT | −10 | Bad KPI |
| CSAT Score | −15 | Bad KPI |
| Hold Time | −40 | Bad KPI |

Table 4 shows an example list of KPIs of Table 3 sorted according to percentage KPI deviation. The sorting may be performed according to step 412 of the algorithm shown in FIG. 4. According to some embodiments, the list of KPIs is sorted in descending order, such that the least deviating KPI is at the top of the list and the most deviating KPI is at the bottom of the list. Other methods of sorting may be used.

TABLE 5

| KPI | % KPI Deviation | KPI State | Weightage |
|---|---|---|---|
| Silence Time | 20 | Good KPI | 1 |
| AHT | −10 | Bad KPI | 2 |
| CSAT Score | −15 | Bad KPI | 3 |
| Hold Time | −40 | Bad KPI | 4 |

Table 5 shows an assigned weight to each KPI, according to the percentage KPI deviation, for example corresponding to step 310 of method 300 shown in FIG. 3. In the example data shown in Table 5, the least deviating KPI has been given a weighting of 1, whereas the most deviating KPI has been given a higher weighting of 4.

TABLE 6

| Interactions | duration_seconds | hold_time_seconds | silence_time_seconds | csat_score |
|---|---|---|---|---|
| interaction 1 | 401 | 35 | 8 | 46 |
| interaction 2 | 270 | 20 | 24 | 73 |
| interaction 3 | 174 | 38 | 13 | 75 |
| interaction 4 | 430 | 40 | 16 | 63 |
| interaction 5 | 138 | 25 | 5 | 53 |
| interaction 6 | 33 | 41 | 25 | 50 |
| interaction 7 | 300 | 22 | 6 | 51 |
| interaction 8 | 314 | 34 | 10 | 48 |
| interaction 9 | 166 | 30 | 27 | 69 |
| interaction 10 | 355 | 34 | 28 | 41 |
| interaction 11 | 400 | 49 | 20 | 72 |
| interaction 12 | 455 | 44 | 16 | 44 |
| interaction 13 | 175 | 22 | 29 | 49 |
| interaction 14 | 222 | 41 | 8 | 57 |
| interaction 15 | 310 | 34 | 22 | 62 |

Table 6 shows example data for 15 interactions. Each interaction is characterized by a number of quality metrics which correspond to the defined KPIs. For example, duration_seconds may be indicative/correspond to an average handling time for that interaction. The data in Table 6 may correspond to that received, for example, in step 304 of method 300 shown in FIG. 3.

TABLE 7

| Interactions | % Deviation For AHT | % Deviation For Hold Time | % Deviation For Silence Time | % Deviation For CSAT Score |
|---|---|---|---|---|
| interaction 1 | −67.09 | −16.67 | 60 | −23.34 |
| interaction 2 | −12.5 | 33.34 | −20 | 21.67 |
| interaction 3 | 27.5 | −26.67 | 35 | 25 |
| interaction 4 | −79.17 | −33.34 | 20 | 5 |
| interaction 5 | 42.5 | 16.67 | 75 | −11.67 |
| interaction 6 | 86.25 | −36.67 | −25 | −16.67 |
| interaction 7 | −25 | 26.67 | 70 | −15 |
| interaction 8 | −30.84 | −13.34 | 50 | −20 |
| interaction 9 | 30.84 | 0 | −35 | 15 |
| interaction 10 | −47.92 | −13.34 | −40 | −31.67 |
| interaction 11 | −66.67 | −63.34 | 0 | 20 |
| interaction 12 | −89.59 | −46.67 | 20 | −26.67 |
| interaction 13 | 27.09 | 26.67 | −45 | −18.34 |
| interaction 14 | 7.5 | −36.67 | 60 | −5 |
| interaction 15 | −29.17 | −13.34 | −10 | 3.34 |

Table 7 shows example percentage deviations calculated for each KPI and for each interaction. The percentage deviation may be calculated using similar equations to EQN. 1 and 2 (other equations may be used). For example:
For KPIs which are better when the value is greater:

$$\% \; KPI \; Deviation = \frac{Relevant \; interaction \; quality \; metric \; value - Desired \; value}{Desired \; value} \times 100 \qquad \text{EQN. 3}$$

For KPIs which are better when the value is lesser:

$$\% \; KPI \; Deviation = \frac{Desired \; value - Relevant \; interaction \; quality \; metric \; value}{Desired \; value} \qquad \text{EQN. 4}$$

The relevant interaction quality metric value may be a value characterizing a property of the interaction, for example duration_seconds may have a value representing a total number of seconds which the interaction lasted; this value may be relevant for the AHT KPI. Table 8 shows an example correspondence between KPIs and the relevant property of the interaction. Other property/quality metric names may be used.

TABLE 8

| KPI | Property In Interaction |
|---|---|
| AHT (average handle time) | duration_seconds |
| Hold Time | hold_time_seconds |
| Silence Time | silence_time_seconds |
| Agent Sentiment | agent_sentiment |
| Customer Sentiment | customer_sentiment |
| CSAT (customer satisfaction score) | csat_score |

As a worked example, the calculation for percentage deviation for silence time for Interaction 1 may look as follows. Since the silence time KPI is of the "Lesser is Better" type, EQN. 4 may be used. The relevant interaction property for silence time may be "silence_time_seconds", so for "Interaction 1" the relevant interaction quality metric value is 8 (see Table 6). Accordingly, % Deviation for Silence Time=(20−8)/20*100=60%.

TABLE 9

| Interactions | Weighted Deviation For AHT | Weighted Deviation For Hold Time | Weighted Deviation For Silence Time | Weighted Deviation For CSAT Score |
|---|---|---|---|---|
| interaction 1 | −201.27 | −83.35 | 60 | −93.36 |
| interaction 2 | −37.5 | 166.7 | −20 | 86.68 |
| interaction 3 | 82.5 | −133.35 | 35 | 100 |
| interaction 4 | −237.51 | −166.7 | 20 | 20 |
| interaction 5 | 127.5 | 83.35 | 75 | −46.68 |
| interaction 6 | 258.75 | −183.35 | −25 | −66.68 |
| interaction 7 | −75 | 133.35 | 70 | −60 |
| interaction 8 | −92.52 | −66.7 | 50 | −80 |
| interaction 9 | 92.52 | 0 | −35 | 60 |
| interaction 10 | −143.76 | −66.7 | −40 | −126.68 |
| interaction 11 | −200.01 | −316.7 | 0 | 80 |
| interaction 12 | −268.77 | −233.35 | 20 | −106.68 |
| interaction 13 | 81.27 | 133.35 | −45 | −73.36 |
| interaction 14 | 22.5 | −183.35 | 60 | −20 |
| interaction 15 | −87.51 | −66.7 | −10 | 13.36 |

Table 9 shows example weighted percentage deviations for each KPI and for each interaction. The weighted percentage deviations may be calculated by multiplying the percentage deviations (e.g. calculated in Table 7) by the weighting assigned to the KPI (e.g. assigned in Table 5).

TABLE 10

| Interactions | Sum of Weighted Deviation |
|---|---|
| interaction 12 | −588.8 |
| interaction 11 | −436.71 |
| interaction 10 | −377.14 |
| interaction 4 | −364.21 |
| interaction 1 | −317.98 |
| interaction 8 | −189.22 |
| interaction 15 | −150.85 |
| interaction 14 | −120.85 |
| interaction 6 | −16.28 |
| interaction 7 | 68.35 |
| interaction 3 | 84.15 |
| interaction 13 | 96.26 |
| interaction 9 | 117.52 |
| interaction 2 | 195.88 |
| interaction 5 | 239.17 |

Table 10 shows an example sum of the weighted deviations for each interaction (e.g. the sum of the percentage KPI deviations over each KPI being considered in the quality plan, shown in Table 9), sorted according to the sum. For example, the interaction with the most negative (e.g. most deviating) total sum may appear at the top of the list, and the interaction with the least negative (e.g. least deviating) sum may appear at the bottom of the list. A number of the most deviating interactions may then be chosen for evaluation, for example the ten most deviating interactions. the data in Tables 9 and 10 may correspond to step 312 of method 300 shown in FIG. 3. It should be noted that embodiments of the invention identify interactions which deviate across more than one KPI.

An embodiment of the invention includes a computer implemented method for continuously monitoring key performance indicator (KPI) targets across a plurality of communications. The communications may be, for example, interactions as described herein and may include phone call, SMS/text message, email, web/digital chat, IVR etc.

The method may include periodically receiving one or more metrics evaluating a communication of the plurality of communications, the one or more metrics corresponding to one of one or more KPI targets. The one or more metrics may be, for example, quality metrics as described herein, and may include characteristics of the communication such as its duration. The one or more metrics may be received with a predetermined frequency corresponding to a frequency of communications, for example after every communication. The one or more KPI targets may be stored in a storage of a computing device, such as storage 130 or datalake 216. Each KPI target may include a desired, required or expected value for the KPI target. The one or more KPI targets may correspond, for example, to at least one of: average handling time; hold time; average response time; inactivity time; and agent sentiment.

The method may include periodically calculating a current value of each of the one or more KPI targets and a deviation of the current value from the corresponding KPI target. A current value may be, for example, calculated as an average value of the metrics for the plurality of the communications corresponding to the KPI target. Deviation may be calculated using EQN. 1.

The method may include periodically weighting the one or more KPI targets according to the calculated deviation. Weighting may include modifying a value, such as an average value, to reflect a greater contribution to deviation than other values. Weighting may be performed as described herein, for example multiplying a percentage deviation value by a weighting value. Weighting may be performed by other methods.

The method may include periodically determining one or more communications of the plurality of communications for further evaluation based on the one or more metrics and the weighted KPI targets. Further evaluation may include automatic speech to text and/or text analysis algorithms. Further evaluation may be performed at an analysis center, such as analysis center 50 shown in FIG. 1A.

The method may include automatically evaluating the one or more determined communications by applying at least one of a speech to text conversion engine and a text analysis engine, to identify at least one issue in the one or more communications. An issue in a communication may be, for example, a poor average handling time, or a phrase/action which resulted in a poor customer satisfaction score. The determined one or more communications of the plurality of communications for further evaluation may include a ranked list of communications, ranked, for example, based on the deviation and/or weighting.

According to one or more embodiments of the invention there is provided a system for monitoring a quality of interactions. The system may include at least one processor (such as processor/controller 105 shown in FIG. 1B) and a memory (e.g. memory 120 shown in FIG. 1B) containing instructions, which, when implemented by the at least one processor causes the processor to perform methods disclosed herein.

The at least one processor may receive, for each of a plurality of interactions, one or more quality metrics corresponding to at least one of one or more quality targets, each quality target including a desired value, such as is described herein for step 304 of FIG. 3.

The at least one processor may determine, on a periodic basis, a current quality value for each of the one or more quality targets, such as is described herein for step 306 of FIG. 3.

The at least one processor may calculate a deviation of the current quality value from the corresponding desired value of the quality performance target, such as is described herein for step 308 of FIG. 3. The processor may use Eqn. 1 to calculate the deviation.

The at least one processor may weight the one or more quality targets according to the calculated deviation, such as is described herein for step 310 of FIG. 3. The processor may use Eqn. 2 to perform the weighting.

The at least one processor may determine a set of one or more interactions for review based on one or more quality metric deviations and the weighted quality targets, such as is described herein for step 312 of FIG. 3.

Embodiments of the invention may improve the technologies of computer automation, big data analysis, and computer use and automation analysis by using specific algorithms to analyze large pools of data, a task which is impossible, in a practical sense, for a person to carry out.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A computer implemented method for monitoring a quality of interactions, the method comprising:

routing, using a private branch exchange (PBX), a plurality of interactions into one or more computer terminals;

recording the plurality of interactions, wherein the recording is initiated upon a connection of each interaction, and wherein the recording is paused during a hold;

storing, by one or more loggers including a web-page logger, interaction data in one or more databases, the interaction data comprising interaction metadata and describing one or more of the plurality of interactions, wherein each of the interactions comprise a network communication between one or more computing devices, wherein the interaction data comprises one or more audio recordings of one or more of the plurality of recorded interactions, and wherein the interaction data is sent using one or more of: a session initiation protocol (SIP), and a web real-time communication (WebRTC), and wherein the interaction metadata comprises: a channel identification, and start and stop times of an interaction;

extracting, for each of the plurality of interactions, one or more quality metrics from the interaction data, each quality metric corresponding to at least one of one or more quality targets, each quality target comprising a desired value, wherein one or more of the quality metrics comprises an average handling time (AHT);

determining, on a periodic basis, a current quality value for each of the one or more quality targets;

calculating a deviation of the current quality value from the corresponding desired value of the quality target;

weighting the one or more quality targets according to the calculated deviation;

periodically sampling, by an interaction sampler, for a set of quality targets including the one or more of the weighted quality targets, the one or more of the plurality of interactions based on one or more of the weighted quality targets, wherein the sampling comprises accessing an interaction index to retrieve the one or more of the plurality of interactions which satisfy the one or more of the weighted quality targets, wherein the interaction index is comprised in a search engine and wherein the interaction metadata is uploaded to the search engine, the interaction metadata sent as one or more metadata packets to a recorded interaction data stream including the interaction data, the recorded interaction data stream comprising one or more data streaming solutions, the one or more data streaming solutions used in a distributed microservice architecture;

determining and storing a set of one or more sampled interactions for review based on one or more quality metric deviations and the weighted quality targets, wherein the determining of the set of one or more sampled interactions comprises binning the set of one or more sampled interactions based on the calculated deviation of the current quality value from the corresponding desired value of the quality target, and wherein the set of one or more sampled interactions for review comprises a list of interactions, the list of interactions ranking the set of one or more sampled interactions according to how deviating the set of one or more sampled interactions are;

distributing, by an evaluation distributor comprised in the interaction sampler, the set of one or more sampled interactions, wherein the distributing of the set of one or more sampled interactions comprises evenly distributing the set of one or more sampled interactions found on the list among one or more available evaluators;

updating, by the evaluation distributor, plan distribution details, the plan distribution details specifying a number of interactions per evaluator to review for a time period, wherein the sampling of interactions is performed according to a plan comprising the plan distribution details, and wherein the updating is performed using create, read, update, and delete (CRUD) techniques;

automatically evaluating the set of one or more sampled interactions, wherein the evaluating comprises applying a speech to text conversion engine to the interaction data, to identify at least one quality issue in the set of one or more sampled interactions; and storing the evaluated one or more of the sampled interactions in the interaction index.

2. The method of claim 1, wherein the one or more quality metrics comprises at least one of: hold time; average response time; inactivity time; and agent sentiment.

3. The method of claim 1, wherein the one or more quality targets correspond to at least one of: interaction direction, and interaction type.

4. The method of claim 3, wherein the interaction direction comprises at least one of incoming and outgoing, and wherein the interaction type comprises at least one of: call, digital chat, short message service (SMS) text, and email.

5. The method of claim 1, wherein the one or more quality metrics are received with a predetermined frequency corresponding to a frequency of interactions.

6. A system for monitoring a quality of interactions, the system comprising:
at least one processor; and
a memory containing instructions, which, when implemented by the at least one processor causes the processor to:

route, using a private branch exchange (PBX), a plurality of interactions into one or more computer terminals;

record the plurality of interactions, wherein the recording is initiated upon a connection of each interaction, and wherein the recording is paused during a hold;

store, by one or more loggers including a web-page logger, interaction data in one or more databases, the interaction data comprising interaction metadata and describing one or more of the plurality of interactions, wherein each of the interactions comprise a network communication between one or more computing devices, wherein the interaction data comprises one or more audio recordings of one or more of the plurality of interactions, and wherein the interaction data is sent using one or more of: a session initiation protocol (SIP), and a web real-time communication (WebRTC), and wherein the interaction metadata comprises: a channel identification, and start and stop times of an interaction;

extract, for each of the plurality of interactions, one or more quality metrics from the interaction data, corresponding to at least one of one or more quality targets, each quality target comprising a desired value, wherein one or more of the quality metrics comprises an average handling time (AHT);

determine, on a periodic basis, a current quality value for each of the one or more quality targets;

calculate a deviation of the current quality value from the corresponding desired value of the quality target;

weight the one or more quality targets according to the calculated deviation;

periodically sample, by an interaction sampler, for a set of quality targets including the one or more of the weighted quality targets, the one or more of the plurality of interactions based on one or more of the weighted quality targets, wherein the sampling comprises accessing an interaction index to retrieve the one or more of the plurality of interactions which satisfy the one or more of the weighted quality targets, wherein the interaction index is comprised in a search engine and wherein the interaction metadata is uploaded to the search engine, the interaction metadata sent as one or more metadata packets to a recorded interaction data stream including the interaction data, the recorded interaction data stream comprising one or more data streaming solutions, the one or more data streaming solutions used in a distributed microservice architecture;

determine and store a set of one or more sampled interactions for review based on one or more quality metric deviations and the weighted quality targets, wherein the determining of the set of one or more sampled interactions comprises binning the set of one or more sampled interactions based on the calculated deviation of the current quality value from the corresponding desired value of the quality target, and wherein the set of one or more sampled interactions for review comprises a list of interactions, the list of interactions ranking the set of one or more sampled interactions according to how deviating the set of one or more sampled interactions are;

distribute, by an evaluation distributor comprised in the interaction sampler, the set of one or more sampled interactions, wherein the distributing of the set of one or more sampled interactions comprises evenly distributing the set of one or more sampled interactions found on the list among one or more available evaluators;

update, by the evaluation distributor, plan distribution details, the plan distribution details specifying a number of interactions per evaluator to review for a time period, wherein the sampling of interactions is performed according to a plan comprising the plan distribution details, and wherein the updating is performed using create, read, update, and delete (CRUD) techniques;

automatically evaluate the set of one or more sampled interactions, wherein the evaluating comprises applying a speech to text conversion engine to the interaction data, to identify at least one quality issue in the set of one or more sampled interactions; and store the evaluated one or more of the sampled interactions in the interaction index.

7. The system of claim 6, wherein the one or more quality metrics comprises at least one of: hold time; average response time; inactivity time; and agent sentiment.

8. The system of claim 6, wherein the one or more quality targets correspond to at least one of: interaction direction, and interaction type.

9. The system of claim 8, wherein the interaction direction comprises at least one of incoming and outgoing, and wherein the interaction type comprises at least one of: call, digital chat, and email.

10. The system of claim 6, wherein the one or more quality metrics are received with a predetermined frequency corresponding to a frequency of interactions.

* * * * *